United States Patent [19]
Johnson et al.

[11] Patent Number: 5,119,899
[45] Date of Patent: Jun. 9, 1992

[54] DRIVER OVERRIDE CONTROL LOGIC FOR A MOTOR VEHICLE POWERTRAIN CONTROL SYSTEM

[75] Inventors: Gregory J. Johnson, Fenton; Susan J. Lane, Holly; Daniel J. Richardson, Grand Blanc; Vivek Mehta, Flint, all of Mich.

[73] Assignee: General Motors Corporation, Detroit, Mich.

[21] Appl. No.: 659,203

[22] Filed: Feb. 21, 1991

[51] Int. Cl.⁵ ............................................. B60K 31/08
[52] U.S. Cl. ................................. 180/177; 74/860; 74/866; 364/424.1; 364/426.04
[58] Field of Search ............ 180/175, 179, 176, 177, 180/178; 123/349, 350, 352; 364/424.1, 426.04; 74/860, 866

[56] References Cited

U.S. PATENT DOCUMENTS

| | | | |
|---|---|---|---|
| 4,658,929 | 4/1987 | Katou et al. | 180/175 |
| 4,736,813 | 4/1988 | Hagama et al. | 180/179 |
| 4,905,786 | 3/1990 | Miyake et al. | 180/176 |
| 4,913,006 | 4/1990 | Tsugama et al. | 180/175 |
| 4,928,780 | 5/1990 | Tada | 180/179 |

*Primary Examiner*—Andres Kashnikow
*Assistant Examiner*—Richard Camby
*Attorney, Agent, or Firm*—Mark A. Navarre

[57] ABSTRACT

A driver override of a cruise control system is detected and employed to suitably alter the powertrain controls. A driver override of the cruise control system is detected by a lack of correspondence between the engine throttle position and the cruise control servo position, taking into account any hysteresis and lash which may occur in the linkage coupling the servo to the throttle. The lash is determined by storing the measured servo position whenever the measured throttle position is equal to a predefined value, and the controller responds during a detected driver override by instituting normal or noncruise related control parameters. This control permits the cruise control parameters to yield smooth control without unnecessary shifting while retaining a more responsive control during driver override conditions.

5 Claims, 5 Drawing Sheets

DRIVER OVERRIDE CONTROL LOGIC FOR A MOTOR VEHICLE POWERTRAIN CONTROL SYSTEM

This invention relates to a powertrain control system for a motor vehicle having a cruise control system, and more particularly, to a control which detects and responds to a driver override of the engine throttle position while the cruise control system is engaged.

BACKGROUND OF THE INVENTION

In motor vehicle cruise control systems, a position controlled servo motor (pneumatic or electric) is mechanically coupled to the throttle of the vehicle engine to effect positioning of the throttle independent of a driver manipulated accelerator pedal. However, the linkage between the accelerator pedal and the throttle remains operative, enabling the driver to independently increase the throttle setting, overriding the throttle setting commanded by the cruise control system. Such an override is typically invoked when the driver wishes to temporarily accelerate the vehicle, to pass another vehicle, for example.

The vehicle powertrain control requirements often differ depending on whether the cruise control mode is engaged, since the primary objective of the cruise control is to maintain a steady vehicle speed. Certain transmission downshifting, for example, is typically inhibited or delayed during operation of the cruise control system.

SUMMARY OF THE PRESENT INVENTION

The present invention is directed to an integrated powertrain control system wherein driver override of a cruise control system is detected and employed to suitably alter the powertrain controls.

According to the control method, a driver override of the cruise control system is detected by a lack of correspondence between the engine throttle position and the cruise control servo position, taking into account any hysteresis and lash which may occur in the linkage coupling the servo to the throttle.

In a first embodiment, the controller compares a measure of the throttle position with an expected throttle position value determined as a function of the servo position and a lash-related term. The lash-related term is determined by storing the measured servo position whenever the measured throttle position is equal to a predefined value. A driver override is indicated when the measured throttle position is significantly greater than the expected throttle position.

In a second embodiment, the controller compares a measure of the servo position with an expected servo position value determined as a function of the engine throttle position and the lash-related term. A driver override is indicated when the measured servo position is significantly less than the expected servo position.

In either embodiment, the controller responds during a detected driver override by reverting to the normal or noncruise related control parameters for the duration of the override. This control permits the cruise control parameters to yield smooth control without unnecessary shifting while retaining a more responsive control during driver override.

DETAILED DESCRIPTION OF THE INVENTION

Figure 1:
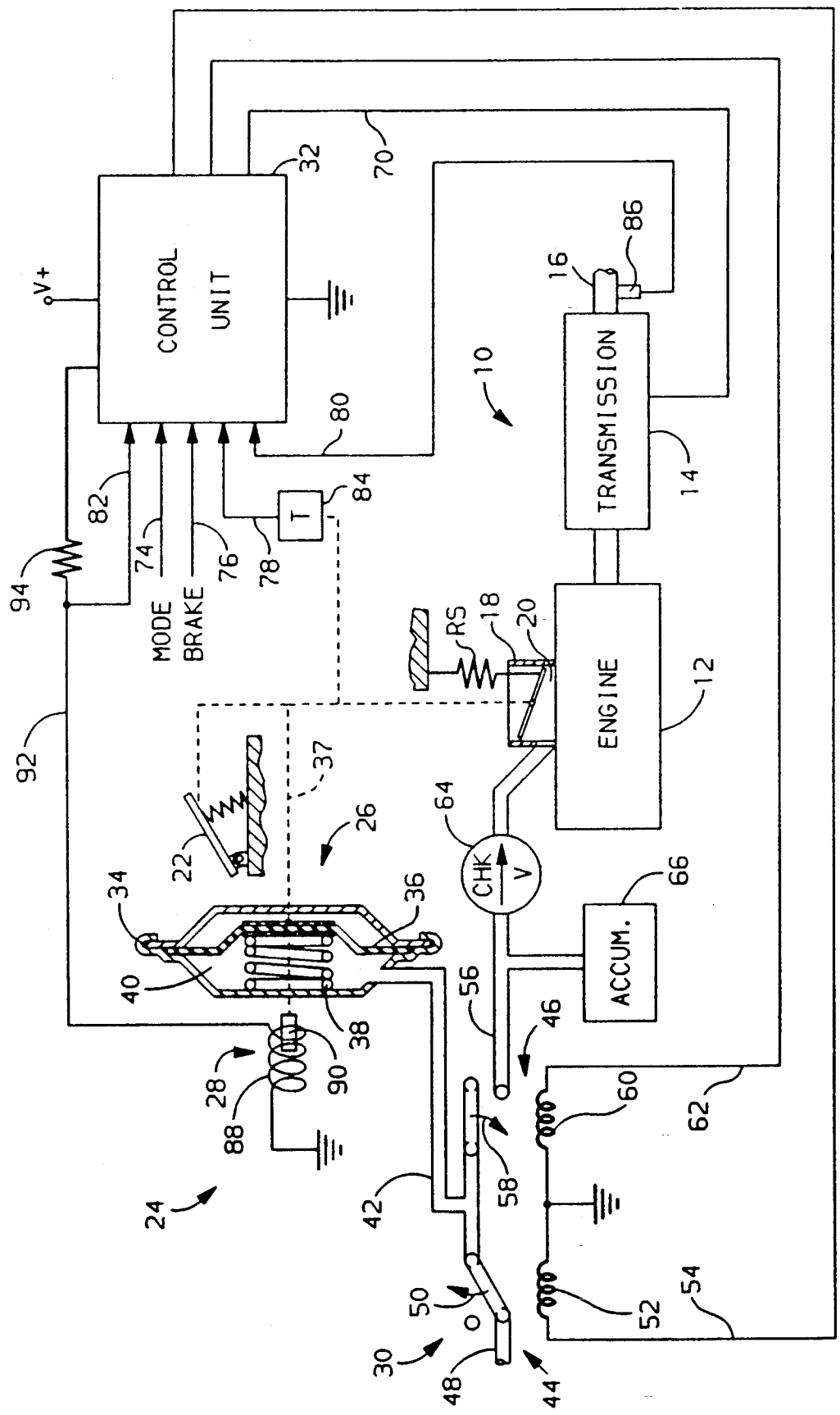
FIG. 1 is a schematic diagram of a motor vehicle servo cruise control system according to this invention, including a computer-based control unit and a pneumatic servo motor.

Referring particularly to FIG. 1, the reference numeral 10 generally designates a motor vehicle powertrain including an internal combustion engine 12 and a multi-speed ratio automatic transmission 14 for transmitting engine output torque to a pair of vehicle drive wheels (not shown) via output shaft 16. The engine 12 has a throttle assembly 18 for regulating the engine power output through positioning of a throttle plate 20. A return spring RS biases the throttle plate 20 to a closed position. The throttle plate 20 may be opened manually by an operator manipulated accelerator pedal 22, or at the option of the operator, automatically by a vehicle cruise control system, designated generally by the reference numeral 24.

The cruise control system 24 comprises a pneumatic servo 26, a servo position sensor 28, a solenoid operated control valve assembly 30 and a computer-based electronic control unit 32, which is also employed for control of transmission 14, as described below.

The servo mechanism 26 comprises a clamshell housing 34 surrounding and retaining a flexible diaphragm 36 which is mechanically coupled to the engine throttle plate 20 via linkage 37. At rest, the diaphragm 36 is displaced rightward, as viewed in FIG. 1, by a spring 38 to relax the mechanical linkage 37. The spring 38 is disposed in a chamber 40 which is coupled to the outlet hose 42 of control valve assembly 30. When the cruise control system 24 is activated by the operator, the control valve assembly 30 operates to draw the chamber 40 to a pressure lower than atmospheric pressure. This moves the diaphragm 36 leftward, as viewed in FIG. 1, against the force of spring 38 to automatically position the throttle plate 20 via linkage 37. In this mode, the operator may override the cruise control system 24 by depressing accelerator pedal 22 to increase the position of throttle plate 20, the occurrence of such an override being detected according to this invention as described below in reference to FIGS. 2, 3 and 5a–5c.

The control valve assembly 30 includes first and second solenoid operated valves 44 and 46, referred to herein as VENT and VAC valves, respectively. The VENT valve 44 normally vents the outlet hose 42 to atmospheric pressure via vent line 48, but is adapted to terminate the venting as indicated by arrow 50 when solenoid coil 52 is energized via line 54. The VAC valve 46 is normally closed, but is adapted to connect outlet hose 42 to vacuum supply line 56 as indicated by arrow 58 when solenoid coil 60 is energized via line 62. In its rest state, control valve assembly 30 thus vents the servo chamber 40 to atmospheric pressure via lines 42 and 48. During cruise control operation, the solenoid coil 52 is energized to close VENT valve 44, except as required to decrease the throttle position, and the solenoid coil 60 is energized as necessary to increase the throttle position.

The vacuum supply line 56 is connected to the engine air intake system downstream of throttle plate 20 via a check valve 64. A vacuum accumulator vessel 66 cooperates with check valve 64 to provide a steady vacuum source for supply line 56.

The control unit 32 controls the energization of solenoid coils 52 and 60 via lines 54 and 62 in response to a number of inputs, including operator manipulated switch signals (line 74), a service brake indicator (line 76), a throttle position signal TPS (line 78), an output speed No signal (line 80) and a servo position signal (line 82). The operator manipulated switches (not shown) typically include an ON/OFF switch for enabling the cruise control system 24, a SET/COAST switch for initiating cruise control operation or reducing the set speed during cruise control operation, and a RESUME/ACCEL switch for resuming cruise control operation at a previously set speed or increasing the set speed during cruise control operation. The service brake signal indicates depression of the vehicle service brakes, and is typically obtained via a limit switch. The throttle position signal is obtained with a potentiometer or similar transducer 84 (T), and the output speed signal is obtained with a conventional magnetic speed pick-up 86.

The servo position signal is obtained from the servo position sensor 28, which in the illustrated embodiment comprises a coil 88 disposed about a ferromagnetic core 90 that is displaced along the axis of the coil 88 with displacement of the servo diaphragm 36. The position of the core 90 within the coil 88 determines the coil inductance so that the coil inductance becomes a measure of the servo diaphragm position. One terminal of the coil 88 is grounded, while the other terminal is connected via line 92 and current limit resistor 94 to a PWM output port internal to control unit 32. The voltage present in the line 92 is supplied as an input to control unit 32 via line 82. To determine the servo position, the control unit 32 periodically charges the coil 99 with current via resistor 94, and then analyzes the decaying coil voltage via line 82. The voltage decay rate varies with the inductance of coil 99 according to a known mathematical relationship. This is a well known technique in the position detection art, and in the illustrated embodiment, provides an accurate indication of the servo diaphragm position. However, other alternative position sensing devices could be employed.

The control unit 32 also initiates shifting between the various speed ratios of automatic transmission 14 via line 70. To this end, the transmission 14 includes one or more solenoid-operated valves adapted to be electrically energized according to a predetermined pattern to establish a desired speed ratio. A representative transmission is the 4T60-E transmission, manufactured by the Powertrain Division of General Motors Corporation. The predetermined solenoid patterns are stored and retrieved by control unit 32 for application to transmission 14 when specified vehicle parameters such as vehicle speed Nv (derived from output speed No) and throttle position TPS are detected.

In the preferred mechanization, the control unit 90 is computer-based, including various conventional components such as a processing unit, volatile and nonvolatile memory, analog-digital conversion devices and suitable input/output devices for receiving input signals and transmitting output signals. The processing unit operates under the control of a program comprising a series of predefined instructions stored in nonvolatile memory. A flow diagram, representative of those program instructions employed in carrying out the control of this invention, is described below in reference to FIGS. 5a–5b.

Figure 2:
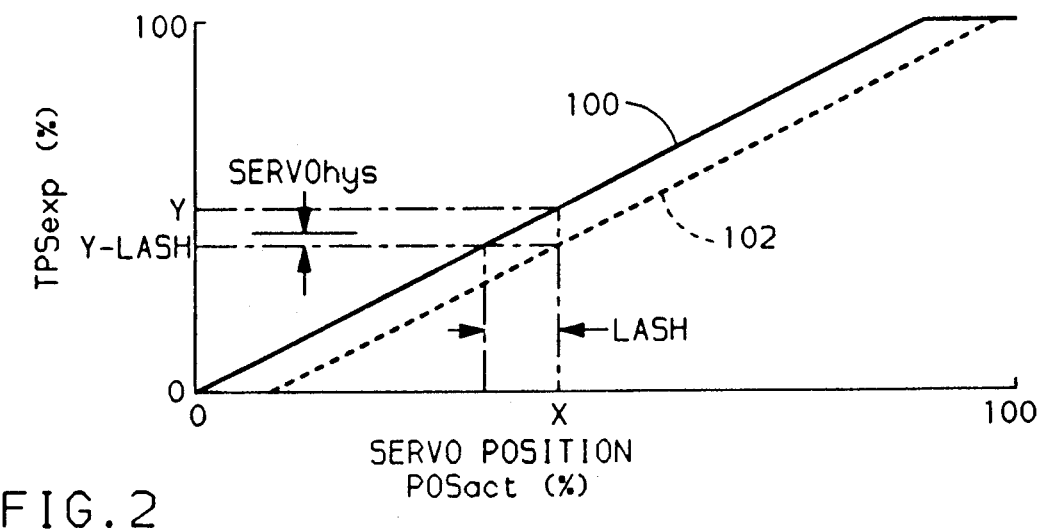
FIGS. 2 and 3 graphically depict the driver override detection according to the first and second embodiments, respectively.
Figure 3:
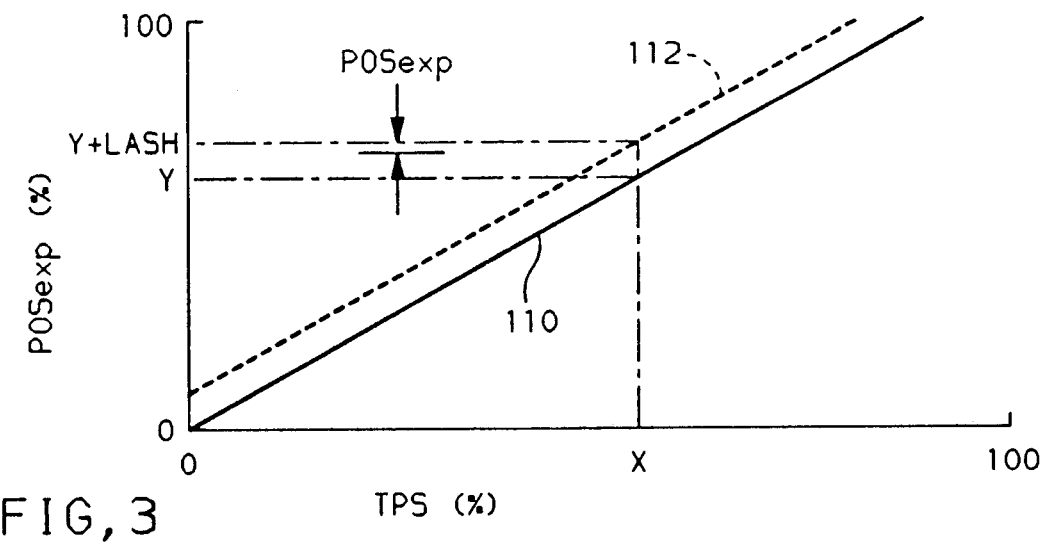

As an intermediate step, however, the graphs of FIGS. 2 and 3 broadly illustrate the driver override detection routines employed by the first and second embodiments, respectively, of this invention.

According to the first embodiment, a driver override of the cruise control system is detected through a comparison of the measured throttle position TPSact with an expected throttle position value TPSexp. The solid trace 100 of FIG. 2 graphically depicts the expected throttle position TPSexp as a function of measured servo position POSact, assuming no lash in the linkage 37. Thus, with no lash, one would expect a throttle position of approximately Y % when the measured servo position is X %. As a practical matter, however, there is always a certain amount of lash or lost motion between the servo position POSact and the throttle position TPSact until the throttle plate 20 opens against the force of return spring RS. This phenomenon is graphically depicted by the broken trace 102, which indicates that the expected throttle position is more closely represented by (Y−LASH) %.

A secondary phenomenon concerning the relationship between servo position and throttle position is hysteresis. This is also a lost motion phenomenon, where a reversal in the direction of travel by the servo 26 may not produce an immediate change in the position of the throttle 20. The effect of this hysteresis is relatively small, as indicated by the term SERVOhys, applied to (Y−LASH) in FIG. 2.

According to the first embodiment of this invention, therefore, the actual throttle position TPSact is compared to an expected throttle position TPSexp determined as a function of (POSact−LASH), compensated for the system hysteresis. The lash is determined by noting the servo position POSact whenever the throttle position TPSact indicates a predefined displacement of throttle plate 20, such as 1%. The hysteresis is subject to less variability and is predefined by a calibrated constant. If the measured throttle position TPSact is greater than the expected throttle position TPSexp, a driver override by virtue of the accelerator pedal 22 is indicated. When the measured throttle position TPSact once again comes into correspondence with the expected throttle position TPSexp, a termination of the override is indicated.

The second embodiment, graphically depicted in FIG. 3, generally parallels the first embodiment, except that a driver override of the cruise control system is detected through a comparison of the measured servo position POSact with an expected servo position value POSexp. The solid and broken traces 110 and 112 of FIG. 3 thus corresponds to the traces 100 and 102 of FIG. 2, respectively. In this embodiment, the measured servo position POSact is compared to an expected servo position POSexp determined as a function of the throttle position TPS, and compensated for the system lash and hysteresis. The lash is determined as described above by noting the servo position POSact whenever the throttle position TPS indicates a predefined displacement of throttle plate 20, such as 1%. If the measured servo position POSact is significantly less than the expected servo position, a driver override by virtue of the accelerator pedal 22 is indicated. When the measured servo position POSact once again comes into correspondence with the expected servo position, a termination of the override is indicated.

An override of the cruise control system 24 generally occurs when the driver wishes to temporarily accelerate the vehicle, as for example, to overtake and pass another vehicle. The control unit should respond in this situation by making the full performance of the powertrain available to the driver. However, this is not the case during cruise control operation when the objective is to maintain a steady speed without excessive powertrain disturbances. In some applications, certain downshifting may be precluded entirely during cruise control operation.

The control of the present invention satisfies both of the above-noted control objectives by making performance oriented transmission controls available to the driver during the override. This control is graphically illustrated by the shift patterns of FIG. 4 for a four-speed automatic transmission 14. The traces 120–134 represent data stored in the nonvolatile memory of control unit 32 as a function of throttle position TPS and vehicle speed Nv. During normal (noncruise control) operation of the vehicle and during cruise control driver overrides, the data represented by trace 120 governs upshifting from 2nd gear to 3rd gear (2-3), and the data represented by trace 122 governs upshifting from 3rd gear to 4th gear (3-4). Similarly, the data represented by trace 124 governs downshifting from 3rd gear to 2nd gear (3-2), and the data represented by trace 126 governs downshifting from 4th gear to 3rd gear (4-3). If the transmission 14 is in 3rd gear, for example, a downshift to 2nd gear will be initiated when the TPS vs. Nv load point lies to the left of 3-2 trace 124, and an upshift to 4th gear will be initiated when the TPS vs. Nv load point lines to the right of 3-4 trace 122.

Figure 4:
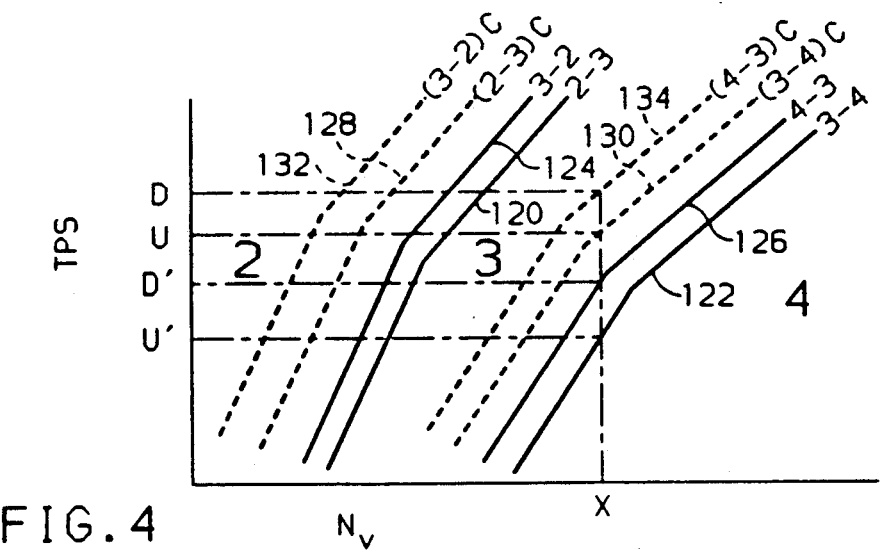
FIG. 4 graphically depicts transmission shift patterns employed during normal cruise and driver override according to this invention.

In cruise control operation, however, the shift pattern traces are effectively shifted leftward to provide delayed downshifting and/or earlier upshifting. A shift pattern providing both delayed downshifting and earlier upshifting is illustrated in FIG. 4 by the shift pattern traces 128–134. Thus, for a given vehicle speed Nv of X MPH during cruise control operation, a 3-4 upshift will occur at a higher load point (throttle position TPS of U % or less) than during normal or driver override operation (throttle position of U' % less). Similarly, a 4—3 downshift will only occur at loads corresponding to a throttle position TPS of D % or higher, as compared to D' % or higher during normal or driver override operation.

Figure 5A:
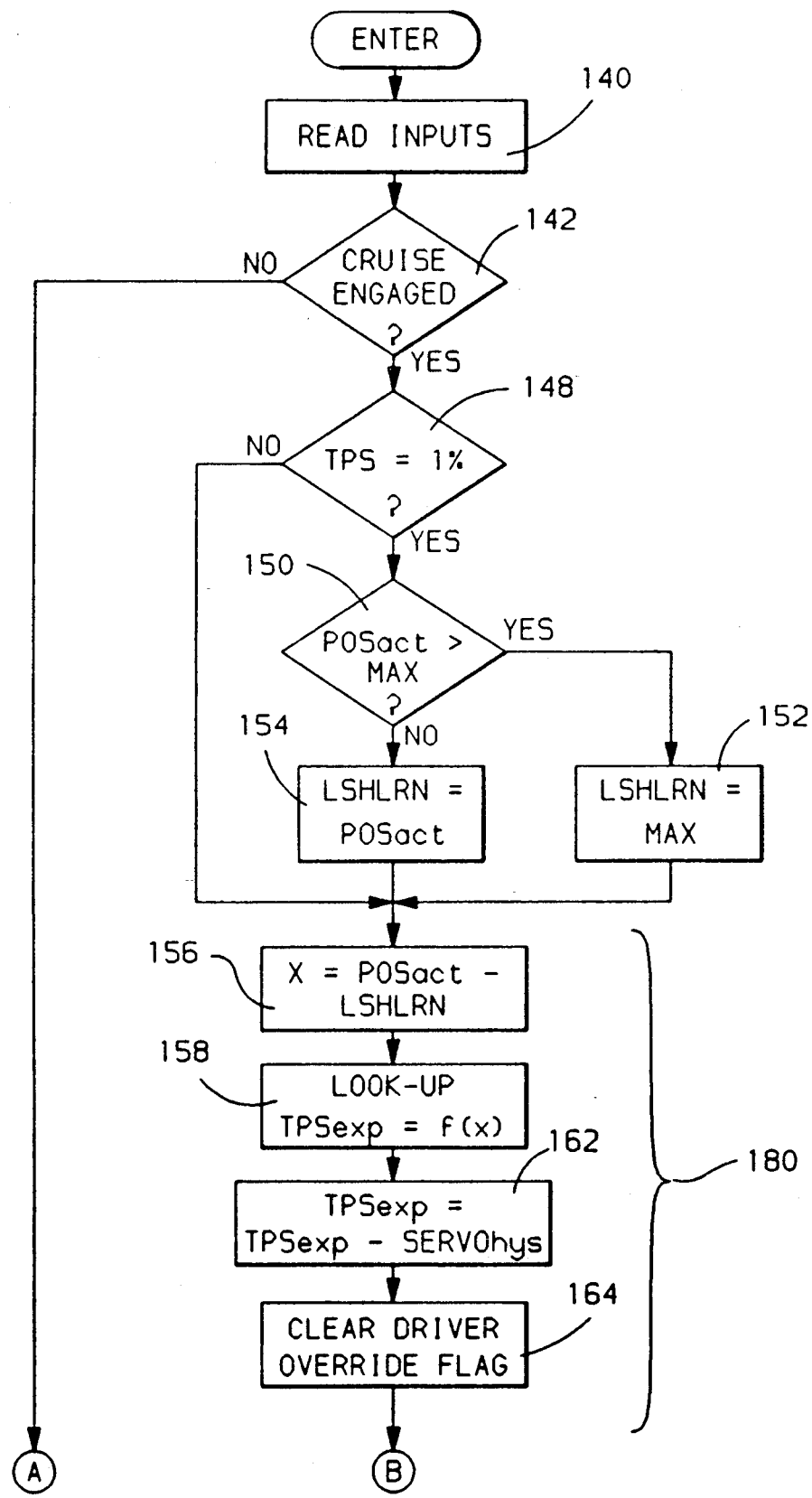
FIGS. 5a–5b depict a flow diagram representative of computer program instructions executed by the computer-based control unit of FIG. 1 in carrying out the control of this invention according to the first embodiment.
Figure 5B:
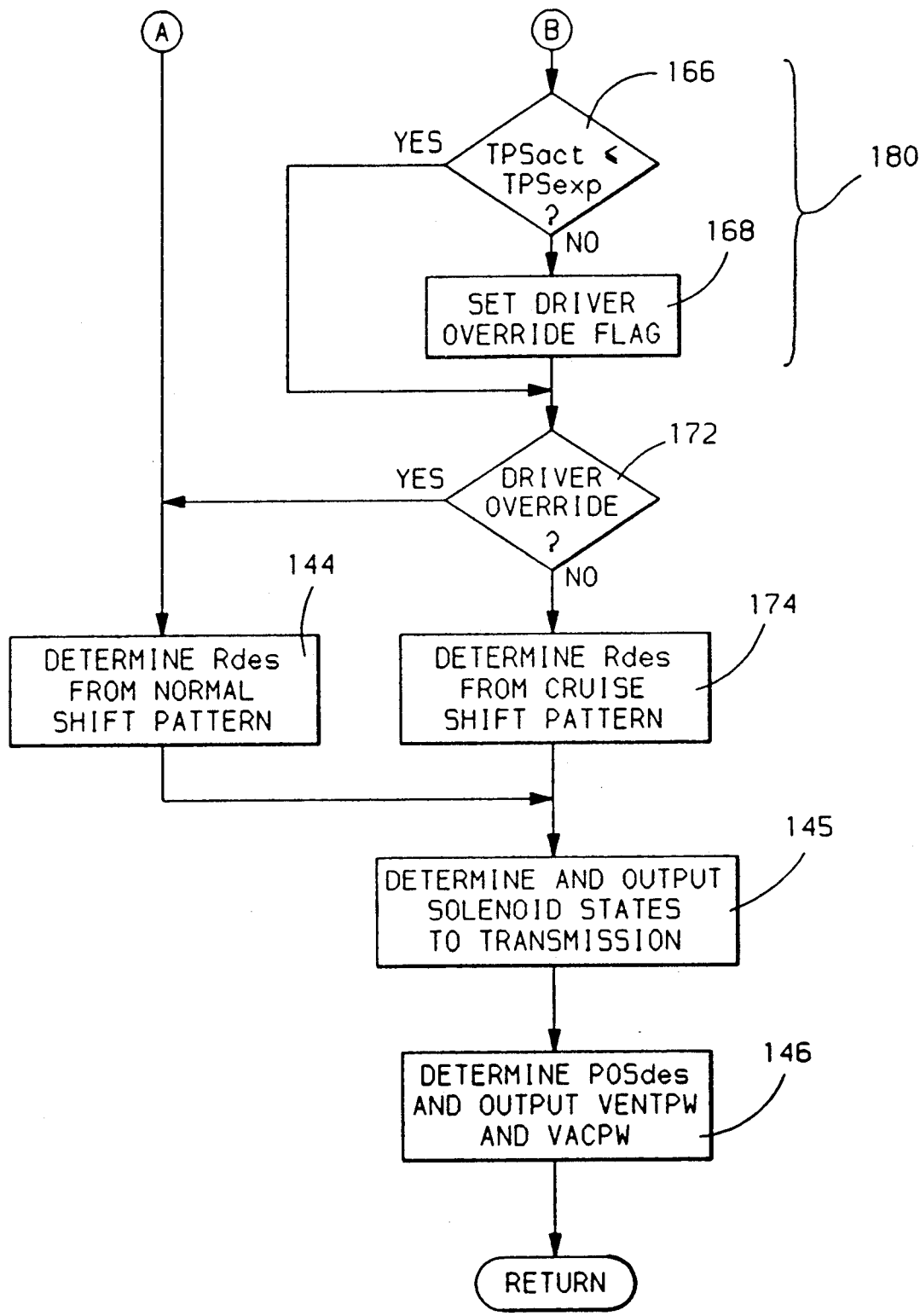
Figure 5C:
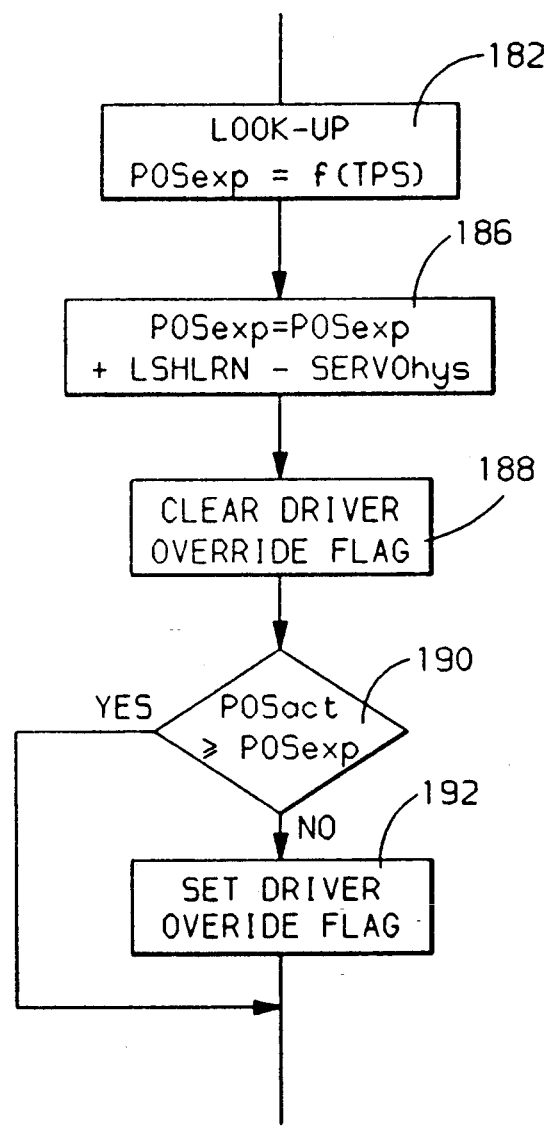
FIG. 5c depicts a flow diagram portion directed to the second embodiment of this invention.

A flow diagram representative of computer program instructions executed by the computer-based control unit 32 of FIG. 1 in carrying out the control of this invention according to the first embodiment is set forth in FIGS. 5a–5b. As indicated at block 140, the first step in the execution of the routine is to read the various input signals discussed in reference to FIG. 1. If the cruise control system 24 is not engaged, as determined at block 142, the blocks 144–146 are executed. Block 144 determines the desired transmission gear (Rdes) from the normal shift pattern data. Block 145 determines and outputs the appropriate solenoid output states to transmission 14 for initiating a shift if the actual transmission gear differs from the desired gear. The block 146 determines the desired servo position POSdes based on the set speed and speed error, and outputs suitable control signals VENTPW and VACPW to VENT control valve 44 and VAC control valve 46.

If the cruise control system is engaged, the blocks 148–154 are executed to update a learned value of the servo linkage lash, designated LSHLRN. The term LSHLRN, initially set to a calibrated value, is set equal to the actual servo position POSact whenever the measured throttle position TPSact is equal to 1%. However, if the measured servo position POSact exceeds a predefined maximum value, MAX, the term LSHLRN is set equal to MAX. This effectively limits the impact of the term LSHLRN to lash values which one would reasonably anticipate to occur.

Thereafter, the blocks 156 and 158 are executed to determine an independent look-up variable X according to the difference (POSact-LSHLRN), and to look-up an expected throttle position value TPSexp as a function of X. This operation corresponds to the above-described graph of FIG. 2, the trace 100 being stored in the subject look-up table.

The blocks 162 and 164 are then executed to reduce the expected throttle position term TPSexp by a hysteresis term SERVOhys and to clear the DRIVER OVERRIDE flag. If a driver override is in effect, as determined at block 166, the block 168 is executed to set the DRIVER OVERRIDE flag. As indicated above in reference to the graph of FIG. 3, a driver override is indicated by the occurrence of a throttle position value in excess of the expected throttle position TPSexp.

If the DRIVER OVERRIDE flag is set, as determined at block 172, the control unit 32 then executes the block 144 to determine the desired transmission gear Rdes based on the normal shift pattern data as described above. If the DRIVER OVERRIDE flag is not set, the block 174 is executed to determine the desired transmission gear Rdes based on the cruise control shift pattern data, described above in reference to traces 128-134 of FIG. 4. In any event, the blocks 145 and 146 are then executed as described above to determine and output the appropriate solenoid output states to transmission 14, and to determine and output suitable control signals to VENT control valve 44 and VAC control valve 46.

A flow diagram for the second embodiment of this invention would parallel the flow diagram depicted in FIGS. 5a–5b, except for the portion designated by the reference numeral 180 in FIG. 5a. Such a flow diagram portion for the second embodiment is set forth in FIG. 5c. Referring to that figure, the instruction block 182 is first executed to look-up an expected servo position value POSexp as a function of the measured throttle position TPS. This operation corresponds to the above-described graph of FIG. 3, the trace 110 being stored in the subject look-up table.

The control unit 32 then executes blocks 186 and 188 to adjust the expected throttle position term TPSexp for lash (LSHLRN) and hysteresis (SERVOhys), and to clear the DRIVER OVERRIDE flag. If a driver override is in effect, as determined at block 190, the block 192 is executed to set the DRIVER OVERRIDE flag. As indicated above in reference to the graph of FIG. 3, a driver override is indicated by the occurrence of a servo position value POSact lower than the expected servo POSexp.

While this invention has been described in reference to the illustrated embodiment, it is expected that various modifications will occur to those skilled in the art. In this regard, it should be understood that systems incorporating such modifications may fall within the scope of this invention which is defined by the appended claims.

The embodiments of the invention in which an exclusive property or privilege is claimed are defined as follows:

1. Control apparatus for a motor vehicle powertrain including a power producing engine, a positionable engine throttle adapted to be opened in opposition to a return spring for increasing the engine power, an accelerator pedal connected to open the throttle by driver manipulation of said pedal, and a cruise control system including a servo having a positionable output member connected to open the throttle independent of the accelerator pedal when the cruise control system is engaged, the control apparatus comprising:

control means for controlling the operation of the powertrain in accordance with a first set of control parameters when the cruise control system is not engaged, and in accordance with a second set of control parameters when the cruise control system is engaged;

means for measuring the position of the servo output member;

means for determining an expected position of said engine throttle in relation to the measured position of said output member;

means for measuring the position of said throttle;

means for indicating the occurrence of a driver override condition when the measure throttle position indicates a greater degree of throttle opening than the expected throttle position; and means responsive to the indication of said driver override condition for overriding the operation of said control means and controlling the operation of the powertrain in accordance with said first set of control parameters.

2. The control apparatus set forth in claim 1, wherein the expected throttle position is offset by a term corresponding to a hysteresis characteristics of said servo.

3. Control apparatus for a motor vehicle powertrain including a power producing engine, a positionable engine throttle adapted to be opened in opposition to a return spring for increasing the engine power, an accelerator pedal connected to open the throttle by driver manipulation of said pedal, and a cruise control system including a servo having a positionable output member connected to open the throttle independent of the accelerator pedal when the cruise control system is engaged, the control apparatus comprising:

control means for controlling the operation of the powertrain in accordance with a first set of control parameters when the cruise control system is not engaged, and in accordance with a second set of control parameters when the cruise control system is engaged;

means for measuring the position of the servo output member;

means for measuring the position of said throttle;

means effective while the cruise control system is engaged for storing a lash offset value in relation to the servo output member position measured at a time when the measured throttle position corresponds to a predetermined throttle opening;

means for determining an expected position of said engine throttle in relation to the servo output member position and said stored lash offset value;

means for indicating the occurrence of a driver override condition when the measured throttle position indicates a greater degree of throttle opening than the expected throttle position; and means responsive to the indication of said driver override condition for overriding the operation of said control means and controlling the operation of the powertrain in accordance with said first set of control parameters.

4. Control apparatus for a motor vehicle powertrain including a power producing engine, a positionable engine throttle adapted to be opened in opposition to a return spring for increasing the engine power, an accelerator pedal connected to open the throttle by driver manipulation of said pedal, and a cruise control system including a servo having a positionable output member connected to open the throttle independent of the accelerator pedal when the cruise control system is engaged, the control apparatus comprising:

control means for controlling the operation of the powertrain in accordance with a first set of control parameters when the cruise control system is not engaged, and in accordance with a second set of control parameters when the cruise control system is engaged;

means for measuring the position of said throttle;

means for determining an expected position of said servo output member in relation to the measured throttle position;

means for measuring the position of said output member;

means for indicating the occurrence of a driver override condition when the measured servo output member position indicates a lesser degree of throttle opening than the expected servo output member position; and means responsive to the indication of said driver override condition for overriding the operation of said control means and controlling the operation of the powertrain in accordance with said first set of control parameters.

5. Control apparatus for a motor vehicle powertrain including a power producing engine, a positionable engine throttle adapted to be opened in opposition to a return spring for increasing the engine power, an accelerator pedal connected to open the throttle by driver manipulation of said pedal, and a cruise control system including a servo having a positionable output member connected to open the throttle independent of the accelerator pedal when the cruise control system is engaged, the control apparatus comprising:

control means for controlling the operation of the powertrain in accordance with a first set of control parameters when the cruise control system is not engaged, and in accordance with a second set of control parameters when the cruise control system is engaged;

means for measuring the position of the servo output member;

means for measuring the position of said throttle;

means effective while the cruise control system is engaged for storing a last offset value in relation to the servo output member position measured when the measured throttle position corresponds to a predefined throttle opening;

means for determining an expected position of said servo output member in relation to the measured throttle position and said last offset value;

means for indicating the occurrence of a driver override condition when the measured servo output member position indicates a lesser degree of throttle opening than the expected servo output member position; and means responsive to the indication of said driver override condition for overriding the operation of said control means and controlling the operation of the powertrain in accordance with said first set of control parameters.

* * * * *